Figure 1:
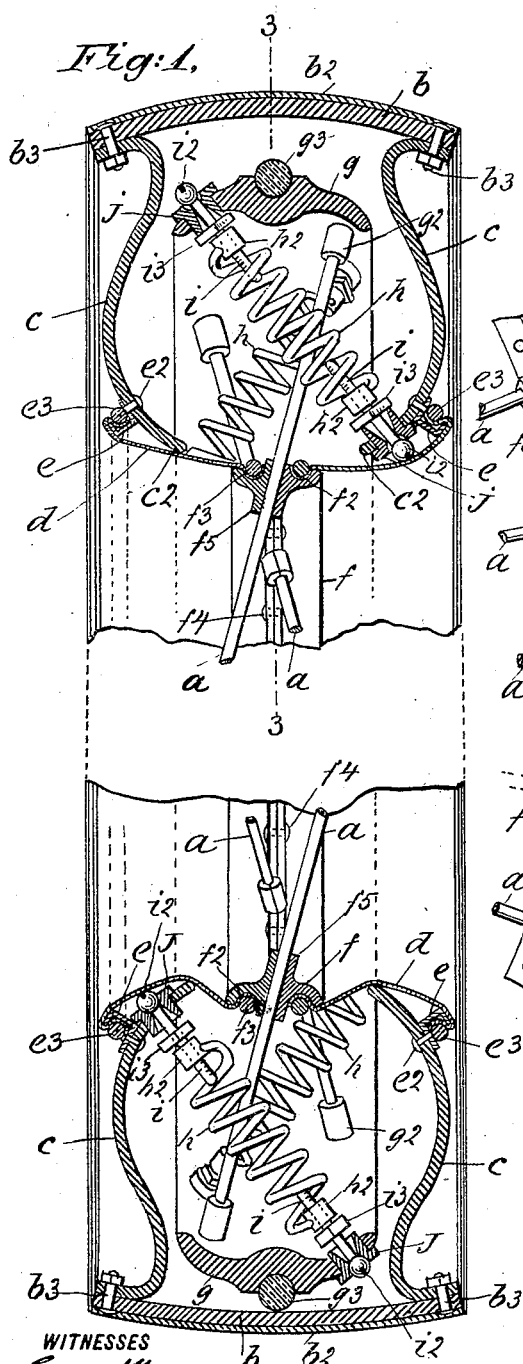

No. 873,876.

PATENTED DEC. 17, 1907.

L. LONG.
WHEEL.
APPLICATION FILED OCT. 3, 1906.

WITNESSES

INVENTOR
Louis Long,
BY Edgar Tate & Co
ATTORNEYS

UNITED STATES PATENT OFFICE.

LOUIS LONG, OF BUCHANAN, NEW YORK.

WHEEL.

No. 873,876.　　　Specification of Letters Patent.　　　Patented Dec. 17, 1907.

Application filed October 3, 1906. Serial No. 337,243.

*To all whom it may concern:*

Be it known that I, LOUIS LONG, a citizen of the United States, and residing at Buchanan, in the county of Westchester and State of New York, have invented certain new and useful Improvements in Wheels, of which the following is a specification, such as will enable those skilled in the art to which it appertains to make and use the same.

This invention relates to wheels for vehicles, and particularly to wheels for bicycles, tricycles and other light vehicles operated either by the rider or by power; and the object thereof is to provide a wheel of this class involving the advantages of an elastic or pneumatic tire, and which also involves the principle of the suspended hub in which the hub and weight carried thereby are suspended from the rim or tire; a further object being to provide a wheel of the class specified which in addition to being used on small or light vehicles of the class described, may also be used when properly made on or in connection with other vehicles of various kinds and classes.

The invention is fully disclosed in the following specification, of which the accompanying drawing forms a part, in which the separate parts of my improvement are designated by suitable reference characters in each of the views, and in which;—

Figure 2:
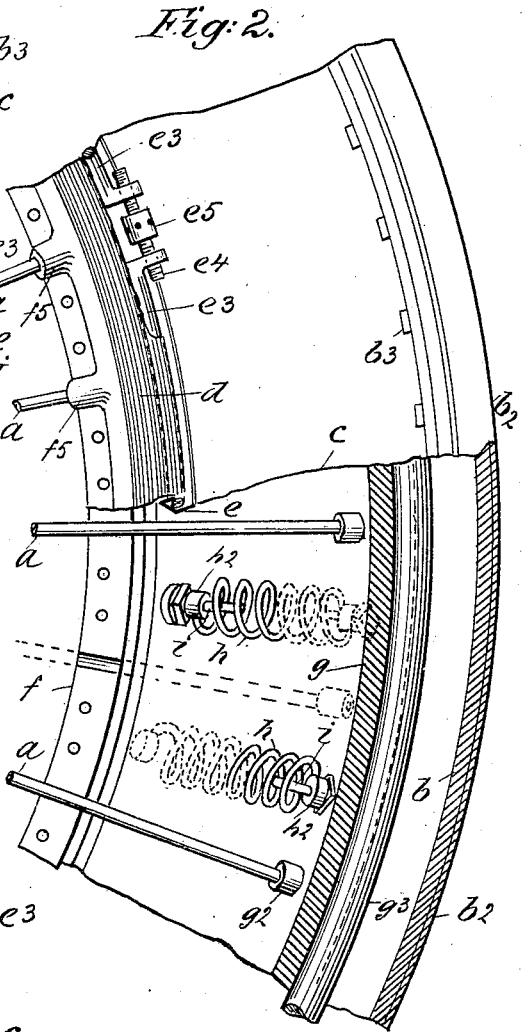

Figure 1 is a central section through a wheel made according to my invention, the hub and hub connections of the spokes being broken out so as to show the tire and rim construction on a larger scale; and, Fig. 2 a sectional side view of a part of the rim and tire construction.

In the drawing forming part of this specification I have shown at $a$ the spokes of a wheel of the class to which my invention is applied, and these spokes are, in practice, similar to those of an ordinary bicycle, tricycle or similar vehicle and are connected with the hub of the wheel in the usual or any desired manner, the hub of the wheel in Fig. 1 of the drawing being omitted or broken out in order to show the tire and rim construction on a larger scale.

The tire and rim construction comprises a tire proper which is shown at $b$ and with which are connected side members $c$. The tire proper consists of a metal plate and may be provided with a supplemental covering $b^2$ of rubber, leather or any other suitable material, and the side members $c$ of the tire and rim construction are also preferably composed of metal and are annular in form as will be understood, and are connected with the tire proper by means of bolts $b^3$, and the central portions thereof are outwardly curved and the inner edges thereof are curved inwardly to form flanges $c^2$, and the space between the inwardly directed flanges $c^2$ of the side members $c$ is closed by a flexible and elastic sheet $d$ of rubber or similar material. The flexible and elastic sheet $d$, which also forms a part of the tire and rim construction, is connected with the side members $c$ by means of annular boxes or keepers $e$ which are U-shaped in cross section and are secured to the outer sides of the side members $c$ at a predetermined distance from the edges of the inwardly directed flanges $c^2$ by means of bolts $e^2$, or in any desired way, and the edges of the flexible sheet $d$ are secured in the annular boxes $e$ by means of rings or bands $e^3$, the ends of which are preferably connected as shown in Fig. 2 by means of a bolt $e^4$ having reversed threads on its opposite ends and provided with a central hub $e^5$ by which it may be turned, and in this way the rings or bands $e^3$ may be tightened so as to securely hold them and the edges of the flexible sheet $d$ in the boxes $e$.

The flexible sheet $d$ is composed of two parts connected by a central annular member $f$, and the separate parts of the central annular member $f$ are provided in their inner surfaces with grooves $f^2$ in which are placed rings or bands $f^3$ similar to the rings or bands $e^3$ and by means of which the inner edges of the separate parts of the flexible sheet $d$ are secured to the central annular member $f$.

The central annular member $f$ is, in practice, preferably composed of two parts bolted together as shown at $f^4$, and in practice the spokes $a$ are passed therethrough as clearly shown in Fig. 1, the separate parts of the central annular member $f$ being provided with bosses $f^5$ through which the spokes are passed, and the bosses $f^5$ are alternately arranged at predetermined different angles and the alternate spokes $a$ pass through said bosses at the same angle.

Within the main outer part of the tire or rim construction hereinbefore described is placed a rim $g$ with which the spokes $a$ are connected as shown at $g^2$, this connection being preferably made by means of bosses formed on or in connection with said rim, and the rim $g$ is preferably substantially segmental in cross section, and placed in the central outer part thereof is a tire $g^3$ composed of rubber, rubber and canvas or similar material.

The inwardly directed annular flanges $c^2$ of the side members $c$ of the main outer part of the tire and rim construction are connected by means of spiral springs $h$, and in the form of construction shown this connection is made in the following manner. Each end of the springs $h$ is provided with a head $h^2$ through which is passed a screw $i$, and in the opposite sides of the rim $g$ and in the inwardly directed flanges $c^2$ of the side members $c$ are secured glands $j$ through which the screws $i$ are passed, and said screws are provided at their outer ends with spherical heads $i^2$ which fit in corresponding recesses in the glands $j$, and the screws $i$ are provided between the heads $h^2$ of the springs $h$ and the glands $j$ with set nuts $i^3$.

The spokes $a$ are secured in the bosses $f^5$ and with the construction described it will be seen that the running tire composed of the parts $b$ and $c$ is suspended by means of the springs $h$, and in the normal position of all the parts of the wheel when there is no load on the wheel, as for instance when the wheel is suspended freely on a spindle, the tire $b$ and the rim $g$ are equi-distant at all points, but when a load is placed on the wheel, or the vehicle with which the wheel is connected is loaded, the separate parts of the tire and rim construction assume the position shown in Fig. 1, in which position the tread tire $b$ bears on the tire $g^3$ which is connected with the rim $g$ as shown at the bottom of Fig. 1, the distance between the tread tire $b$ and the tire $g^3$ being increased as shown at the top of Fig. 1, and in this way the load, whatever it may be, is suspended from the top of the rim $g$ in any position that the wheel may assume, thereby causing the springs $h$ at the top of the wheel to be compressed and the springs $h$ at the bottom of the wheel to be extended.

The tire construction proper consists of the tread tire $b$, the side members $c$ and the flexible sheet $d$ and these parts form an annular space in which the rim $g$ and the springs $h$ are placed, and the sheet $d$ which may be composed of rubber, rubber and canvas or any other flexible and elastic material, forms as will be seen a closure device for the annular space in which the rim $g$ and springs $h$ are placed and excludes dirt from said space, and in the operation of the wheel as herein described the said sheet $d$ bends or is forced inwardly as shown at the bottom of Fig. 1, and outwardly as shown at the top of Fig. 1. My invention, however, is not limited to the use of the sheet $d$ and some other form of device for this purpose may be employed if desired, and various other changes in and modifications of the construction herein described may be made without departing from the spirit of my invention or sacrificing its advantages.

Although I have described the sheet $d$ as forming a part of the tire construction, it will be seen that the running tire actually consists of the tread tire $b$ and the side members $c$, and this running tire possesses a greater or less degree of flexibility and elasticity according to the method of its construction and is suspended from the rim $g$ with which the spokes $a$ are rigidly connected, this suspension being accomplished by means of the tension springs $h$, and with this construction the running tire proper as will be seen incloses the rigid rim $g$, and this construction of the running tire will yield to the influence or impact that may be applied thereto either at right angles to the hub or diagonally thereto.

Having fully described my invention, what I claim as new and desire to secure by Letters Patent, is;—

1. In a wheel, a rim and tire construction comprising a rim member with which the spokes are connected, said spokes being crossed and the alternate spokes connected with the opposite side portions of said rim member, and a running tire of greater diameter than said rim member and having inwardly directed side portions which inclose said rim member, and inwardly directed spiral springs connecting said rim member and the inwardly directed portions of the running tire, substantially as shown and described.

2. In a wheel, a rim and tire construction comprising a rim member with which the spokes are connected, said spokes being crossed and the alternate spokes connected with the opposite side portions of said rim member, and a running tire of greater diameter than said rim member and having inwardly directed side portions which inclose said rim member, and inwardly directed spiral springs connecting said rim member and the inwardly directed portions of the running tire, said spiral springs being crossed and the alternate springs being connected with the opposite side portions of the running tire, substantially as shown and described.

3. In a wheel, a rim and tire construction comprising a rim member with which the spokes are connected, said spokes being crossed and the alternate spokes connected with the opposite side portions of said rim member, and a running tire of greater diameter than said rim member and having inwardly directed side portions which inclose said rim member, and inwardly directed spiral springs connecting said rim member and the inwardly directed portions of the running tire, said spiral springs being crossed and the alternate springs being connected with the opposite side portions of the running tire, and the end connections of said springs being adjustable ball and socket connections, substantially as shown and described.

4. In a wheel, a rim and tire construction comprising a rim member with which the spokes are connected, said spokes being crossed and the alternate spokes connected with the opposite side portions of said rim member, and a running tire of greater diameter than said rim member and having inwardly directed side portions which inclose said rim member, and inwardly directed spiral springs connecting said rim member and the inwardly directed portions of the running tire, said spiral springs being crossed and the alternate springs being connected with the opposite side portions of the running tire, and the end connections of said springs being adjustable ball and socket connections, the inwardly directed side portions of the running tire being also connected by a flexible cover through which the spokes are passed and with which said spokes are connected, substantially as shown and described.

5. In a wheel, a rim and tire construction comprising a tread tire, inwardly directed annular side members connected therewith and the inner edges of which are separated by an annular space and curved inwardly, said tread tire and side members forming a circular chamber which opens inwardly, a rim placed in said circular chamber and of less diameter than said tread tire, and inwardly directed tension springs connected with the opposite sides of the rim and with the inwardly directed edges of said side members, the spokes of the wheel being passed into said annular chamber and connected with the rim.

6. In a wheel, a rim and tire construction comprising a tread tire, inwardly directed annular side members connected therewith and the inner edges of which are separated by an annular space and curved inwardly, said tread tire and side members forming a circular chamber which opens inwardly, a rim placed in said circular chamber and of less diameter than said tread tire, and inwardly directed tension springs connected with the opposite sides of the rim and with the inwardly directed edges of said side members, the spokes of the wheel being passed into said annular chamber and connected with the rim, and the annular opening formed by the inwardly directed edges of the side members being closed by a flexible and elastic sheet through which the spokes are passed and in which said spokes are secured.

7. In a wheel, a rim and tire construction comprising a tread tire, inwardly directed side members secured thereto and the inner edges of which are separated, said tread tire and said side members forming an annular chamber which opens inwardly, a rim placed in said circular chamber and of less diameter than the tread tire, and tension springs secured to the opposite side portions of the rim and to the inwardly directed edges of said side members, the spokes of the wheel being alternately crossed and passed into said annular chamber and connected with the opposite side portions of said rim.

8. In a wheel, a rim and tire construction comprising a tread tire, inwardly directed side members secured thereto and the inner edges of which are separated, said tread tire and said side members forming an annular chamber which opens inwardly, a rim placed in said circular chamber and of less diameter than the tread tire, and tension springs secured to the opposite side portions of the rim and to the inwardly directed edges of said side members, the spokes of the wheel being alternately crossed and passed into said annular chamber and connected with the opposite side portions of said rim, and a flexible sheet secured to the side members and closing the opening of said annular chamber and through which the spokes are passed and in which said spokes are secured.

In testimony that I claim the foregoing as my invention I have signed my name in presence of the subscribing witnesses this 29th day of September 1906.

LOUIS LONG.

Witnesses:
GEORGE J. SHAW,
A. D. MABIEND.